United States Patent
Menner et al.

(10) Patent No.: US 12,005,914 B2
(45) Date of Patent: Jun. 11, 2024

(54) METHOD AND SYSTEM FOR DRIVING CONDITION-AGNOSTIC ADAPTATION OF ADVANCED DRIVING ASSISTANCE SYSTEMS

(71) Applicant: Mitsubishi Electric Research Laboratories, Inc., Cambridge, MA (US)

(72) Inventors: Marcel Menner, Cambridge, MA (US); Stefano Di Cairano, Newton, MA (US); Karl Berntorp, Cambridge, MA (US); Ziyi Ma, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 300 days.

(21) Appl. No.: 17/651,923

(22) Filed: Feb. 22, 2022

(65) Prior Publication Data
US 2023/0264704 A1    Aug. 24, 2023

(51) Int. Cl.
*B60W 50/10*    (2012.01)
*B60W 30/09*    (2012.01)
*B60W 30/12*    (2020.01)
*B60W 30/16*    (2020.01)
*B60W 50/00*    (2006.01)

(52) U.S. Cl.
CPC ............ *B60W 50/10* (2013.01); *B60W 30/09* (2013.01); *B60W 30/12* (2013.01); *B60W 30/16* (2013.01); *B60W 2050/0075* (2013.01); *B60W 2556/45* (2020.02)

(58) Field of Classification Search
CPC ...... B60W 50/10; B60W 30/09; B60W 30/12; B60W 30/16; B60W 2050/0075; B60W 2556/45; B60W 50/087; B60W 2554/408; B60W 2556/05; B60W 2556/50; B60W 50/0098; B60W 2050/0088
See application file for complete search history.

(56) References Cited

U.S. PATENT DOCUMENTS

| | | | | |
|---|---|---|---|---|
| 2016/0358477 | A1* | 12/2016 | Ansari | B60W 60/0059 |
| 2019/0329770 | A1* | 10/2019 | Rajab | H04W 4/46 |
| 2020/0180650 | A1* | 6/2020 | Lee | B60W 60/0018 |
| 2022/0126864 | A1* | 4/2022 | Moustafa | B60W 30/182 |
| 2022/0324467 | A1* | 10/2022 | Alvarez | G08G 1/096725 |

* cited by examiner

*Primary Examiner* — Jason Holloway
(74) *Attorney, Agent, or Firm* — Gene Vinokur; Hironori Tsukamoto

(57) ABSTRACT

A vehicle includes an advanced driver-assistance system (ADAS) configured to intervene in an operation of the control system by complementing or overriding the driving input in response to detecting a driving condition dependent on a calibration parameter indicative of a preference of execution of the driving maneuver. The ADAS is calibrated based on a crowd-local distribution function of the calibration parameter indicative of a distribution of the preference of execution of the driving maneuver by other drivers of other vehicles at a specific location or a specific environment in response to detecting that the vehicle approaches the specific location or the specific environment.

19 Claims, 12 Drawing Sheets

METHOD AND SYSTEM FOR DRIVING CONDITION-AGNOSTIC ADAPTATION OF ADVANCED DRIVING ASSISTANCE SYSTEMS

TECHNICAL FIELD

The present invention relates generally to vehicle control, and more specifically to a method and system for the automatic adaptation of advanced driving assistance systems.

BACKGROUND

An advanced driver-assistance system (ADAS) aims to increase the safety of a human-operated vehicle by partially taking control of the vehicle. However, this increase in safety may come at the expense of comfort if the ADAS is configured too conservatively or too aggressively. Consequently, ADAS aims to increase safety while not decreasing the comfort of the human driver. However, the feeling of comfort may vary between individual human drivers. Furthermore, driving conditions such as traffic or environmental conditions may vary, while ADAS is typically calibrated at the production of the vehicle and not adjusted online.

Intelligent mobility such as adaptive ADASs is beneficial for smart cities. In particular, a vehicle may adapt its ADASs may consider traffic dynamics, which vary with location, time, weather, or other drivers. However, current systems lack intelligence and the ability to fuse traffic information and vehicle reports to generate a reliable traffic model. Hence, in order to achieve robust smart mobility, vehicle controllers need real-time traffic models.

Accordingly, there is a need to overcome the above-mentioned problem. More specifically, there is a need to develop a method and system for controlling the automatic adaptation of advanced driving assistance systems in an efficient and feasible manner, where personal preference and traffic dynamics are considered.

SUMMARY

Vehicle connectivity and crowdsourcing offer new potential for storing and processing data of past and current driving patterns collected from multiple drivers. These data may be utilized to determine patterns of behavior across drivers, for example, patterns that impact all drivers, such as the weather or accidents. Furthermore, by providing a vehicle with such data, the operation of ADAS may be individualized by contrasting the individual driver with a group of drivers, while taking into consideration effects that impact all traffic participants. In such crowdsourcing applications, anonymity should be considered to ensure privacy, which is achieved by data aggregation and lack of identifier-based data labeling.

To that end, this present disclosure provides a method and/or system that adapts the calibration of ADAS online to the individual human driver, as well as to a specific location or environmental condition, using crowdsourced data. The method and system work without the need for the crowdsourced data to be labeled to indicate a driver or a driving condition. Hence, the method and system are agnostic to the driving condition. In other words, the method and system adapt the calibration of ADAS online using data measuring the effect such as longer braking distances or higher energy/fuel consumption without the need to know the cause such as icy roads and higher traffic congestion.

Some embodiments are based on understanding that there are different types of crowdsourced data. For example, one type of crowdsourced data considers the specific location of data providers. For example, these crowdsourced data are collected around a specific intersection. This type of crowdsourced data is referred to herein as being a crowd-local. Another type of crowdsourced data is referred to herein as crowd-global. The crowd-global information does not have a connection to a specific location or a driving condition and can be collected over a wider local.

Some embodiments are based on the realization that adapting the calibration of ADAS online can be achieved with one or multiple crowd-local distributions. The one or multiple crowd-local distributions relate to the driving behavior of multiple drivers in a specific location or a specific environment. In other words, the crowd-local distributions provide a range of different driving behaviors and their likelihoods within a spectrum. For example, the one or multiple crowd-local distributions may provide the range of a braking distance ahead of a specific traffic light, energy consumption of the vehicle, lateral accelerations, and the like.

The vehicle under control also referred to herein as an ego-vehicle may use the crowd-local distributions in order to adapt the operation of one or multiple components of a vehicle control such as the automatic emergency braking (AEB) system, an adaptive cruise control (ACC) system, a collision warning system, a lane-keeping assistant, and the like. For example, the AEB may be adapted to operate more cautiously if the crowd-local distributions indicate prolonged braking distances for the multiple vehicles in the specific location or the specific environment such as an icy road. Additionally or alternatively, the crowd-local distributions may be used in order to adapt a driving mode of the vehicle such as eco-driving mode, comfort driving mode, sport driving mode, and the like. For example, the driving mode may be automatically switched to the eco-driving mode if the crowd-local distributions indicate higher energy/fuel consumption or increased congestion for the multiple vehicles in the specific location or the specific environment such as a traffic jam.

Some embodiments use crowdsourcing in order to obtain the crowd-local distributions. In particular, some embodiments use crowdsourced data collected from multiple drivers in a specific location or environment to derive the crowd-local distributions. The data are driving-condition agonistic. Some further embodiments use analytical cumulative distribution functions (CDF) for the crowd-local distributions. Some other embodiments use empirical cumulative distribution functions (ECDFs) to form the one or multiple crowd-local distributions. Advantages of the analytical CDFs include the applicability of analytical operations such as computing a gradient and the like. Advantages of the ECDFs include that the functions are flexible in their shape and can approximate any shape of distributions functions that no function class has to be chosen for the application of the system.

Some embodiments use quantile functions of the crowd-local distributions in order to adapt the operation of one or multiple components of the vehicle. In probability and statistics, the quantile function, associated with a probability distribution of a random variable, specifies the value of the random variable such that the probability of the variable being less than or equal to that value equals the given probability. This value, referred to herein as a quantile value, allows considering the probabilistic nature of crowdsourced data to deterministically calibrate the parameter. In addition, quantiles are cut-points used by some embodiments for dividing the range of a probability distribution indicative of calibration parameters into continuous intervals with equal or considered to be equal probabilities. By using fewer quantiles than the number of groups created, some embodiments create a resolution of adjustment of calibration parameters. Common quantiles have special names, such as quartiles (four groups), deciles (ten groups), and percentiles (100 groups). The groups created are termed halves, thirds, quarters, etc.

For example, the adaptation of the operation of one or multiple components may be done using the value of the median of the crowd-local distribution. For example, the median value may refer to a median braking distance of the crowd-local distribution, which may be used to trigger a collision warning. Additionally or alternatively, a different quantile value may be used to trigger braking of the AEB system.

Some embodiments are based on a recognition that a specific quantile value can be associated with an ego-vehicle and/or a driver of the ego-vehicle and used to adapt the crowdsourced data for the individual driving preference. For example, if the 42nd quantile out of 100 quantiles (percentile) is associated with the ego-vehicle, the quantile value can be used to adapt the calibration parameter provided by a crowd-local distribution. In this example, one embodiment partitions the crowd-local distribution into hundred groups averages the calibration parameter within each group and selects the value of the calibration parameter of the 42nd group. If the 42nd quantile out of 50 quantiles is associated with the ego-vehicle, the embodiment would partition the crowd-local distribution into 50 groups. As a result, the embodiment allows determining a deterministic value of the calibration parameter represented in a probabilistic manner.

Additionally or alternatively, one embodiment uses a quantile value to adjust the crowd-local distribution. For example, one embodiment can shift the crowd-local distribution left or right with a shift selected as a function of a difference between the quantile value and the median. Doing in such a manner allows preserving statistical properties of the crowd-local distribution while adapting it to the preferences of the individual driver.

As an example of adapting the calibration of ADAS, one of the parameters of the ACC that may be calibrated using quantile values is the distance to be kept from a vehicle driving ahead. The ACC may be adjusted based on a crowd-local distribution indicating the average distance that the multiple vehicles in the specific location or environment kept from the vehicle driving ahead of them. For example, if the median of the crowd-local distribution indicates the average distance is 30 m, then the ACC may be adjusted to keep a distance of 30 m from a vehicle ahead of the vehicle. In this scenario, the median denotes the 50th quantile out of 100 quantiles and the associated quantile value is 30 m. If the median of the crowd-local distribution indicates the average distance is 80 m, then the ACC may be adjusted to keep a distance of 80 m from a vehicle ahead of the vehicle. This example of the adjustable ACC may be useful to adjust the vehicle to the current situation. For example, if the vehicle is driving on highly-congested roads during rush hour, then the ACC may need to keep a shorter distance to the vehicle ahead of the vehicle. Otherwise, other vehicles may pull in ahead of the vehicle, which may be perceived as uncomfortable and may trigger the ACC to brake in order to keep a certain distance from the vehicle that pulled in ahead. On the other hand, if the vehicle is driving on country roads during the night, then the ACC may need to keep a longer distance to the vehicle ahead of the vehicle to increase safety. Otherwise, the vehicle ahead of the vehicle may be blinded by the headlights of the vehicle, which may be dangerous. On the other hand, some drivers may want to be more cautious, and thus may want to use the 60th quantile out of 100 quantiles rather than the median. Then, the ACC may be adjusted to keep slightly longer distances from the vehicle driving ahead, which may be perceived as more comfortable by some drivers.

Further, some embodiments use an adjustable setting, which may be set by a driver of the vehicle to determine the quantile to be used to adapt the operation of the one or multiple components of the vehicle control. For example, the adjustable settings may be a quantitative setting relating to the quantile or a qualitative setting such as average, cautious, or aggressive, which may be translated to specific quantiles. Advantages of the user interface are that the driver of the vehicle may control or fine-tune the level of interventions of ADAS systems and that the crowd-local distributions are used to adapt the operation of the vehicle in order to account for environmental or location-specific effects such as congestion, icy roads, and the like. One advantage of using the adjustable setting is that no data of the vehicle need to be collected.

In some other embodiments, two or more crowd-local distributions may be combined. For example, the one or multiple components of the vehicle control may be adapted based on a quantity being not directly available but computed using two other quantities. For example, the combination of different crowd-local distributions may be used to compute a quantity, which is divided into two or multiple road segments. Examples of this combination include the energy/fuel consumption of the vehicle, where the crowd-local distributions provide information about energy/fuel consumption in such road segments. Other examples of this combination of different crowd-local distributions may be to compute the braking distance including a reaction time buffer.

In some other embodiments, the quantile may be determined based on one or multiple crowd-global distributions, which reflect driving behaviors from multiple drivers in multiple locations or multiple environments. Additionally or alternatively, the quantile may be determined based on one or multiple ego-global distributions, which reflect driving behaviors from the vehicle in multiple locations or multiple environments. One advantage of using the one or multiple crowd-global distributions and the one or multiple ego-global distributions for computing the quantiles is that the user interface may not be needed. Instead, the quantiles may be computed automatically.

Some embodiments use crowdsourced data in order to obtain the crowd-global distribution. In particular, some embodiments use data collected from multiple drivers in multiple locations or multiple environments to derive the crowd-global distribution. The ego-global distributions may be stored locally in the vehicle and may be obtained from data collected from the ego vehicle in multiple locations or multiple environments. Similar to the crowd-local distributions, the crowd-global distributions and the ego-global distributions may be given by analytical CDFs or by ECDFs.

One advantage of using both the crowd-global distribution and the ego-global distribution may be that the resulting quantile value for adapting the is individualized to each driver. The crowd-global distributions and the ego-global distributions may be used to compute a ranking of the ego vehicle with respect to the multiple vehicles. For example, the ego vehicle may rank at the 42th quantile with respect to the multiple vehicles in terms of the braking distance. The quantile value may then be used in order to calibrate the AEB system of the vehicle. For example, the quantile value may be used to trigger a warning signal to the driver of the vehicle may be used to intervene in the control of the vehicle by triggering the braking. Hence, for calibrating AEB for a cautious driver having collected longer breaking distances reflected in the ego-global distribution, the quantile value may be higher and the AEB may be triggered earlier. For calibrating AEB for a more aggressive driver having collected shorter braking distances reflected in the ego-global distribution, the quantile value may be smaller and the AEB may be triggered later.

In some other embodiments, one or multiple ego-local distributions may be used directly in order to adapt the operation of the vehicle, rather than using the quantile value. The one or multiple ego-local distributions may be computed using the one or multiple crowd-global distributions, the one or multiple crowd-local distributions, and the one or multiple ego-global distributions. For example, a range of quantile values may be computed resulting in a data set, which may be used to in order to obtain an analytical CDF or an ECDF. The one or multiple ego-local distributions may be used to gradually increase the level of intervention by the ADAS. For example, a braking assistance system may start braking with little braking pressure earlier and gradually increase the braking pressure depending on the distance to the traffic light and the ego-local distribution. As another example, the driving mode may be gradually adjusted based on the ego-local distribution reflecting the energy/fuel consumption. For example, rather than having distinct driving modes such as eco-driving mode, comfort driving mode, or a sport driving mode, the driving mode may be adjusted gradually.

In some other embodiments, confidence levels may be used in order to adapt the operation of the vehicle. The confidence levels may be given as a function of the number of data points collected. In other words, the more data samples the system has, the more confident it may be about intervening or triggering an action appropriately. The confidence level may be used to compute a lower bound of the ECDF and an upper bound of the ECDF. The lower bound and/or the upper bound may be used in order to adapt the operation of the vehicle. For example, the lower bound may be used in order to calibrate the AEB. Using the lower bound may have the advantage that the system is more confident about intervening in controlling the vehicle and may not intervene unnecessarily. Unnecessary intervention may be perceived as discomforting by a driver of the vehicle.

Accordingly, one embodiment discloses a vehicle including a control system configured to accept a driving input from a driver of a vehicle and transform the driving input into actuation of wheels of the vehicle to perform a driving maneuver; an advanced driver-assistance system (ADAS) configured to intervene in an operation of the control system by complementing or overriding the driving input in response to detecting a driving condition dependent on a calibration parameter indicative of a preference of execution of the driving maneuver; a receiver configured to receive over a wireless channel a crowd-local distribution function of the calibration parameter indicative of a distribution of the preference of execution of the driving maneuver by other drivers of other vehicles at a specific location or a specific environment; and a processor configured to adapt the calibration parameter of the ADAS based on the crowd-local distribution function of the calibration parameter in response to detecting that the vehicle approaches the specific location or the specific environment.

Another embodiment discloses a method for controlling a vehicle, including accepting a driving input from a driver of a vehicle and transforming the driving input into actuation of wheels of the vehicle to perform a driving maneuver;

receiving over a wireless channel a crowd-local distribution function of the calibration parameter indicative of a distribution of the preference of execution of the driving maneuver by other drivers of other vehicles at a specific location or a specific environment; adapting a calibration parameter of an advanced driver-assistance system (ADAS) based on the crowd-local distribution function of the calibration parameter in response to detecting that the vehicle approaches the specific location or the specific environment; and complementing or overriding the driving input using the ADAS calibrated with the calibration parameter indicative of a preference of execution of the driving maneuver.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
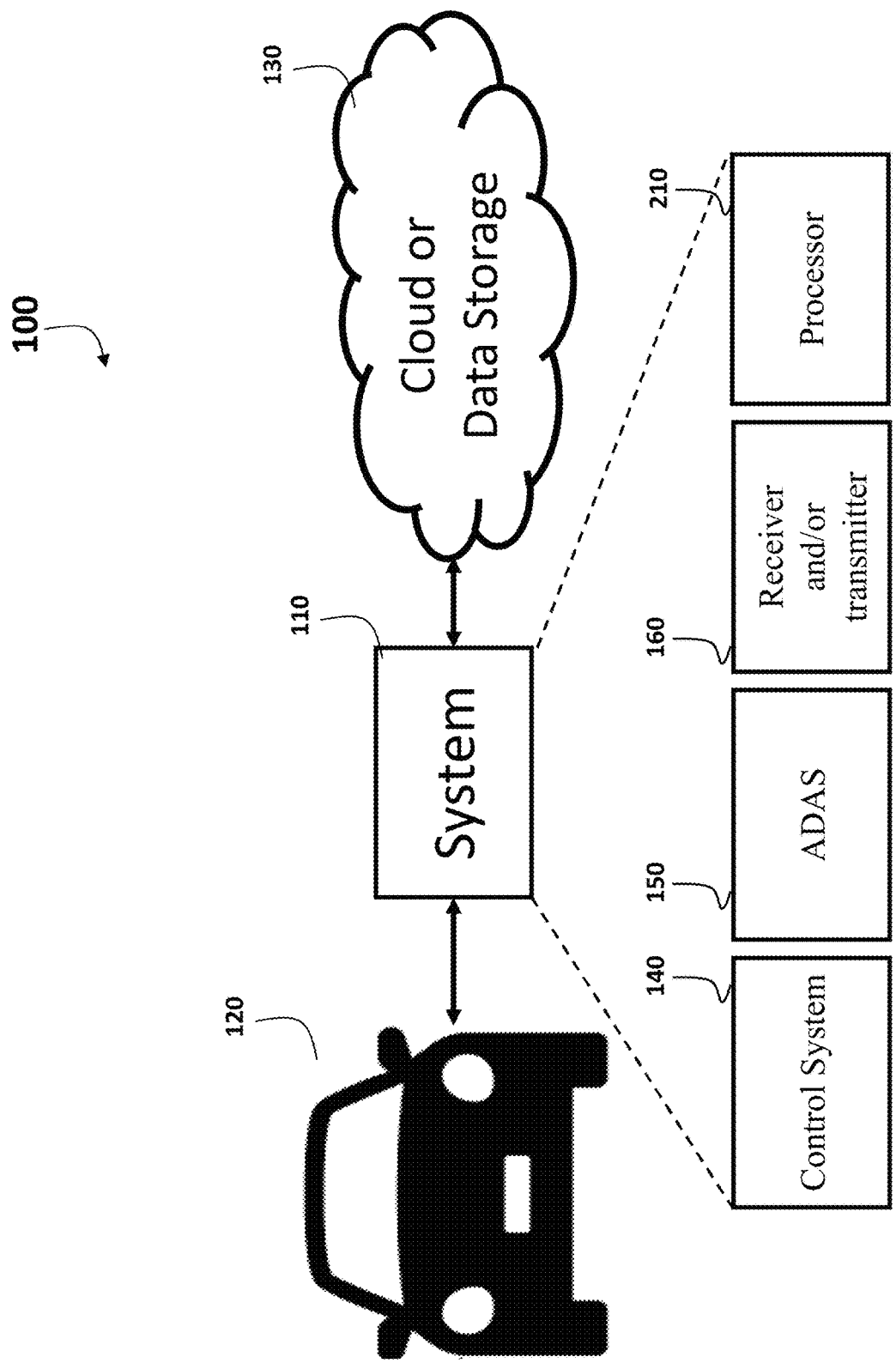
FIG. 1 illustrates an environment of a system for controlling a motion of a vehicle, according to some embodiments of the present disclosure.

FIG. 1 illustrates an environment 100 of a system 110 for controlling a motion or one or multiple components of a vehicle 120, according to embodiments of the present disclosure. System 110 may use data from a cloud or data storage 130. For example, system 110 may control advanced driver-assistance systems (ADAS) of the vehicle 120 such as automatic emergency braking (AEB) or the like.

To that end, system 110 of the vehicle 120 includes a control system 140 configured to accept a driving input from a driver of a vehicle and transform the driving input into actuation of wheels of the vehicle to perform a driving maneuver. Examples of the control system 140 a steering system, such as electric power steering (EPS), breaking system connecting brake paddles with the pads of the wheels of the vehicle, engine system for accelerating the vehicle, and the like.

The vehicle also includes an advanced driver-assistance system (ADAS) 150 configured to intervene in an operation of the control system by complementing or overriding the driving input in response to detecting a driving condition dependent on a calibration parameter indicative of a preference of execution of the driving maneuver. For example, the ADAS system may initiate or complement the braking of the vehicle to stop at the desired stopping line, acceleration of the vehicle to maintain a distance from a leading vehicle, or a steering command to maintain the vehicle in the middle of the lane.

Also, the vehicle includes a receiver 160 configured to receive over a wireless channel a crowd-local distribution function of the calibration parameter indicative of a distribution of the preference of execution of the driving maneuver by other drivers of other vehicles at a specific location or a specific environment, and a processor 210 configured to adapt the calibration parameter of the ADAS based on the crowd-local distribution function of the calibration parameter in response to detecting that the vehicle approaches the specific location or the specific environment.

For example, in one embodiment, the ADAS includes an automatic emergency braking (AEB) system, and the calibration parameter indicates one or a combination of a distance to a stopping line when the AEB starts to intervene or complement the driving input commanding the control system to brake the vehicle and a ratio between an extent of braking and a distance to a stopping line. That calibration parameter is adjusted based on the crowd-local distribution function received from a remote location. Additionally or alternatively, in one embodiment, the ADAS includes adaptive cruise control (ACC) system, and the calibration parameter indicates a target distance to be kept from a leading vehicle driving ahead of the vehicle.

Figure 2:
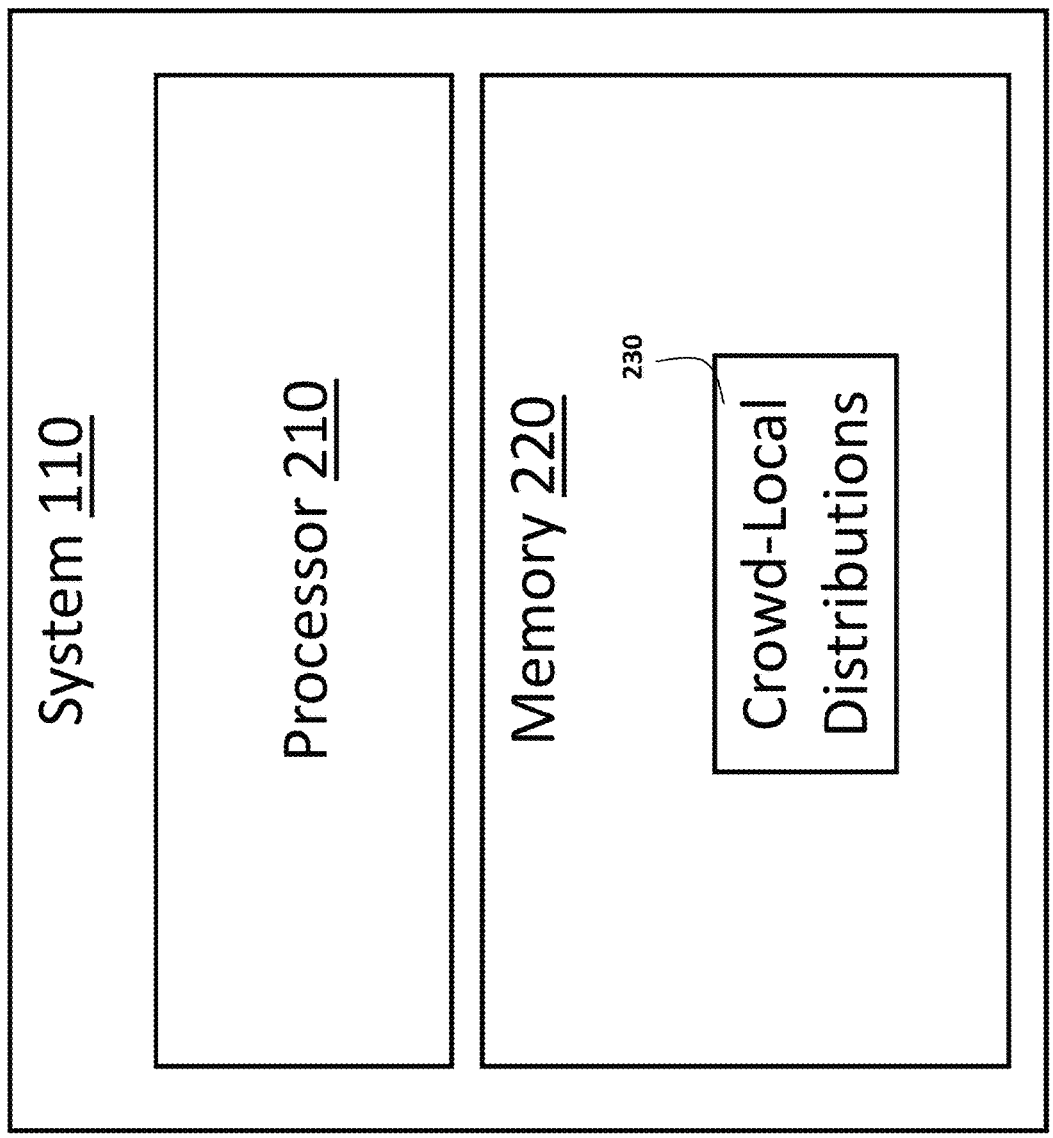
FIG. 2 illustrates a block diagram of a control system for controlling an operation of a vehicle, according to some embodiments of the present disclosure.

FIG. 2 shows a block diagram 200 of the system 110 for controlling the motion or components of the vehicle 120, according to some embodiments of the present disclosure. The system 110 includes a processor 210 and a memory 220 storing one or multiple crowd-local distributions 230. The processor 210 is configured to execute stored instructions in the memory 220 to cause the system 110 to execute one or multiple actions in order to control the vehicle 120. The system 110 may use data provided from the cloud or data storage 130. For example, the cloud or data storage 130 may provide the system 110 with the one or multiple crowd-local distributions 230.

Figure 3:
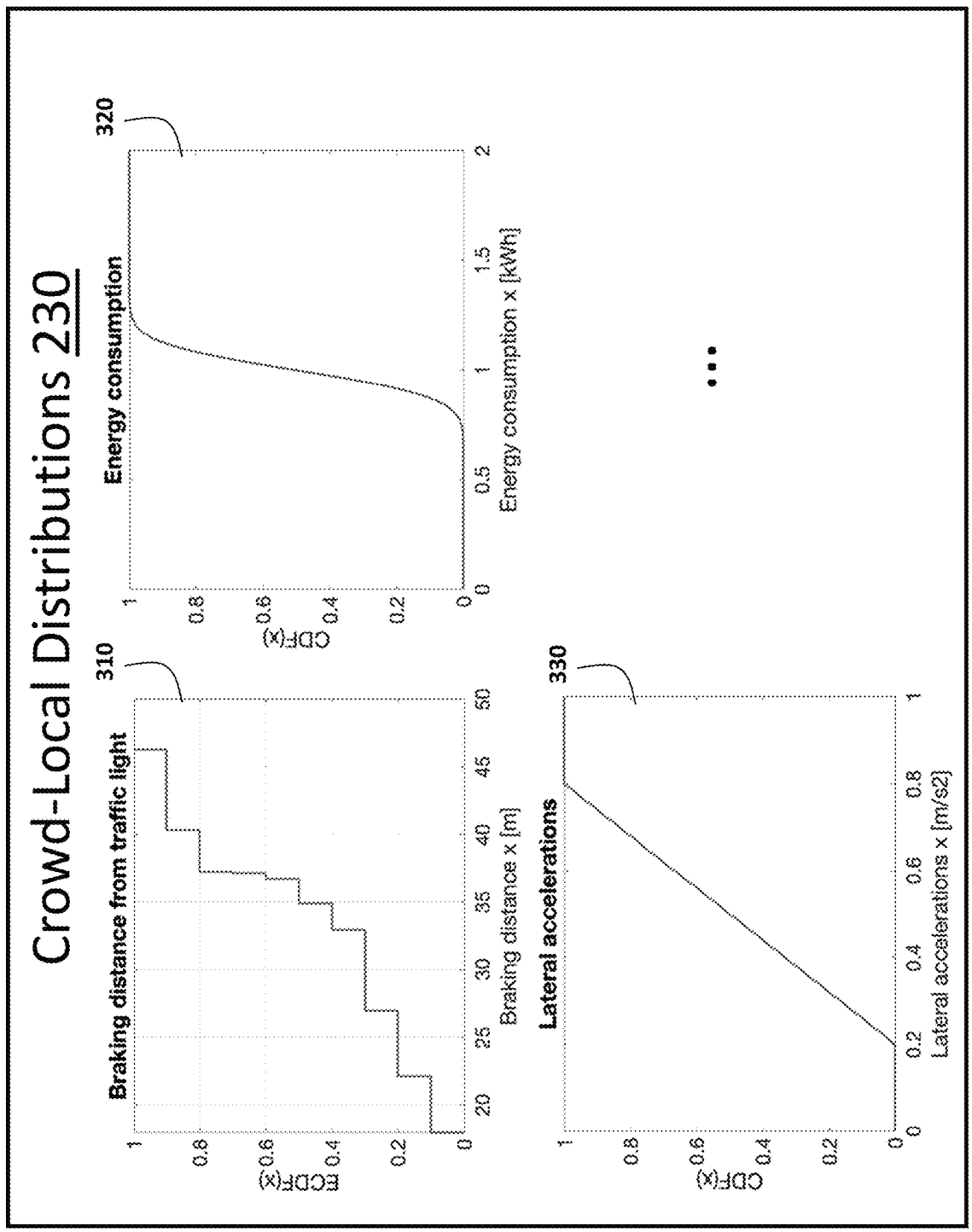
FIG. 3 illustrates examples of crowd-local distributions, according to some embodiments of the present disclosure.

The one or multiple crowd-local distributions 230 relate to driving behavior of multiple drivers in a specific location or a specific environment. In other words, the crowd-local distributions provide a range of different driving behaviors and their likelihoods within a spectrum. FIG. 3 shows examples of the crowd-local distributions 230 using cumulative distribution functions (CDF) or empirical cumulative distribution functions (ECDF). The examples include a braking distance ahead of a traffic light 310, an energy consumption 320 of the vehicle 120, or lateral accelerations 330.

Figure 4:
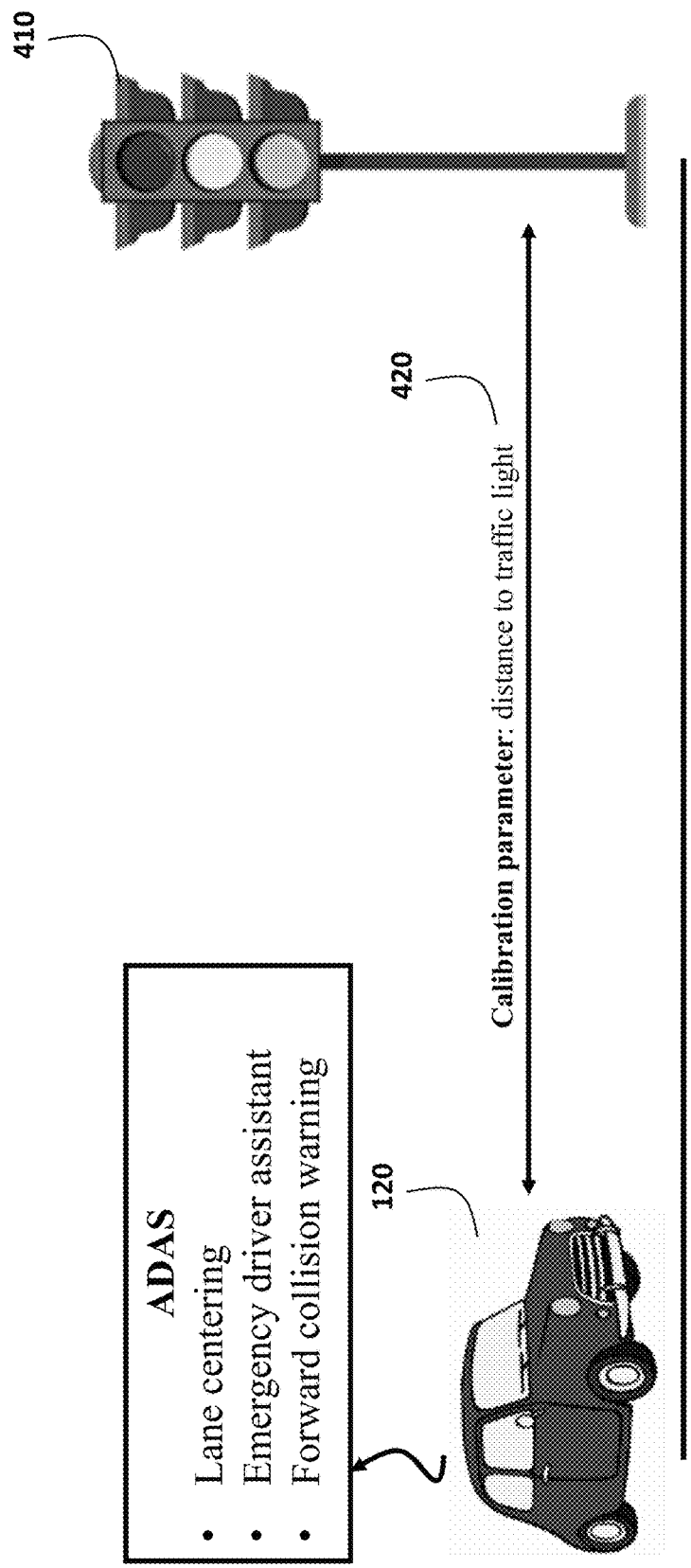
FIG. 4 illustrates an example for adapting the operation of an automatic emergency braking system, according to some embodiments of the present disclosure.

The vehicle 120 may use the crowd-local distributions 230 in order to adapt the operation of one or multiple components of a vehicle control such as the AEB system, an adaptive cruise control (ACC) system, a collision warning system, a lane-keeping assistant, and the like. For example, the AEB may be adapted to operate more cautiously if the crowd-local distributions 230 indicate prolonged braking distances 310 for the multiple vehicles in the specific location or the specific environment such as an icy road. Additionally or alternatively, the crowd-local distributions 230 may be used in order to adapt a driving mode of the vehicle such as eco driving mode, comfort driving mode, sport driving mode, and the like. For example, the driving mode may be automatically switched to the eco driving mode if the crowd-local distributions 230 indicate higher energy/fuel consumption 320 or increased congestion for the multiple vehicles in the specific location or the specific environment such as a traffic jam. FIG. 4 illustrates an example, where the AEB of the vehicle 120 is adapted to be triggered at a specific calibration distance 420 from a traffic light 410.

Some embodiments use crowdsourcing in order to obtain the crowd-local distributions 230. In particular, some embodiments use data collected from multiple drivers in the specific location or the specific environment to derive the crowd-local distributions 230. The data may be a set of the form $$\text{Data}_{CL} = \{x_{CL,1}, x_{CL,2}, \ldots, x_{CL,n}\}, \qquad (1)$$

where $x_{CL,i}$ are the n data points, which may represent physical or calculated values of the observed driving behaviors from the multiple drivers in the specific location or the specific environment. The values $x_{CL,i}$ may be specific to the ADAS functionality. For example, for adapting the AEB system, the value $x_{CL,i}$ may be the specific braking distance ahead of the traffic light 410.

Figure 5:
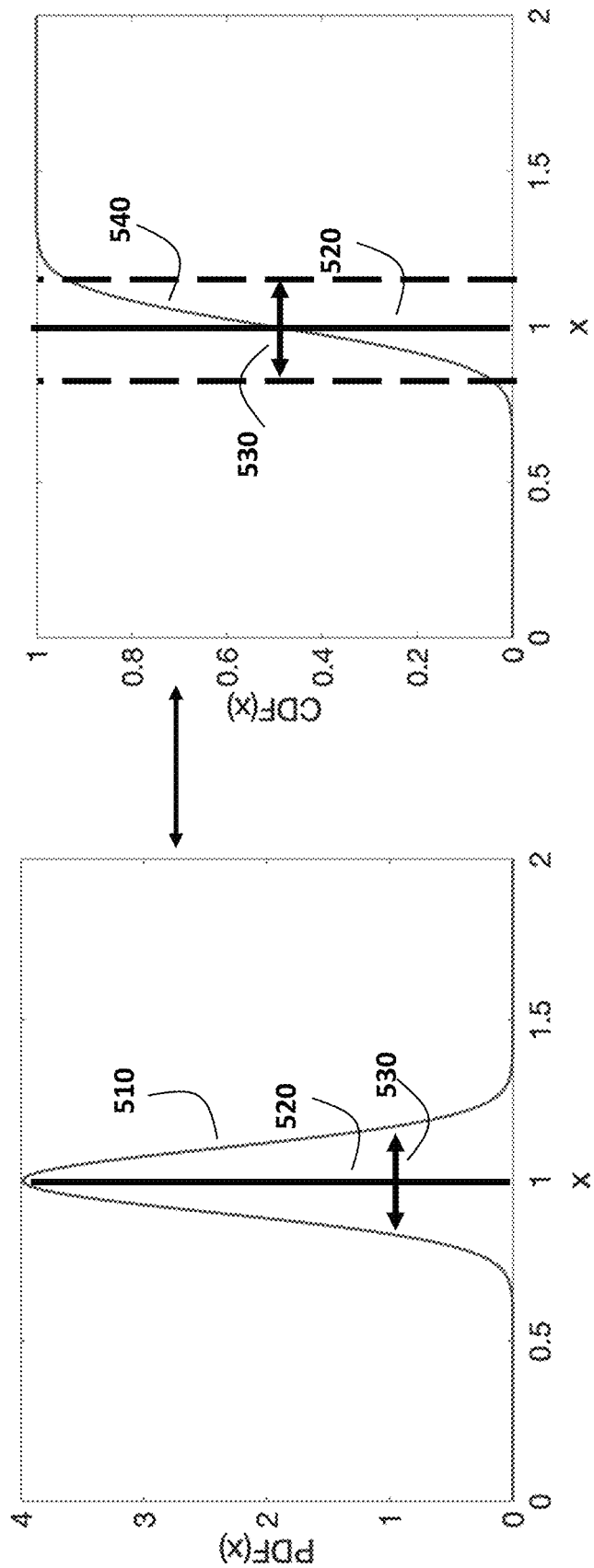
FIG. 5 illustrates a one-dimensional Gaussian distribution, according to some embodiments of the present disclosure.

Some further embodiments use analytical CDF for the crowd-local distributions, which are integrals of probability density function (PDF). Examples of analytical CDF include Gaussian distributions, Laplace distributions, Gamma distributions, uniform distributions, or the like. For such analytical cumulative distribution functions, the data gathered from different driving conditions as in (1) are used to learn parameters of the distributions. For example, the PDF of a one-dimensional Gaussian distribution is given by $$pdf_{CL}(x) = \frac{1}{\sigma_{CL}\sqrt{2\pi}} \exp\left(-\frac{1}{2}\left(\frac{x - \mu_{CL}}{\sigma_{CL}}\right)^2\right). \quad (2)$$

and the CDF is given by $$cdf_{CL}(x) = \frac{1}{2}\left(1 + \text{erf}\left(\frac{x - \mu_{CL}}{\sigma_{CL}\sqrt{2}}\right)\right) \quad (3)$$

with an error function erf. Hence, the one-dimensional Gaussian distribution is uniquely defined by two parameters being a mean $\mu_{CL}$ and a variance $\sigma_{CL}^2$. FIG. 5 illustrates the one-dimensional Gaussian distribution with the PDF 510 and the CDF 540, where the mean $\mu_{CL}$ 520 and the variance $\sigma_{CL}^2$ 530 may be computed as $$\mu_{CL} = \frac{1}{n}\sum_{i=1}^{n} x_{CL,i}, \ \sigma_{CL}^2 = \frac{1}{n}\sum_{i=1}^{n} (x_{CL,i} - \mu_{CL})^2. \quad (4)$$

Figure 6:
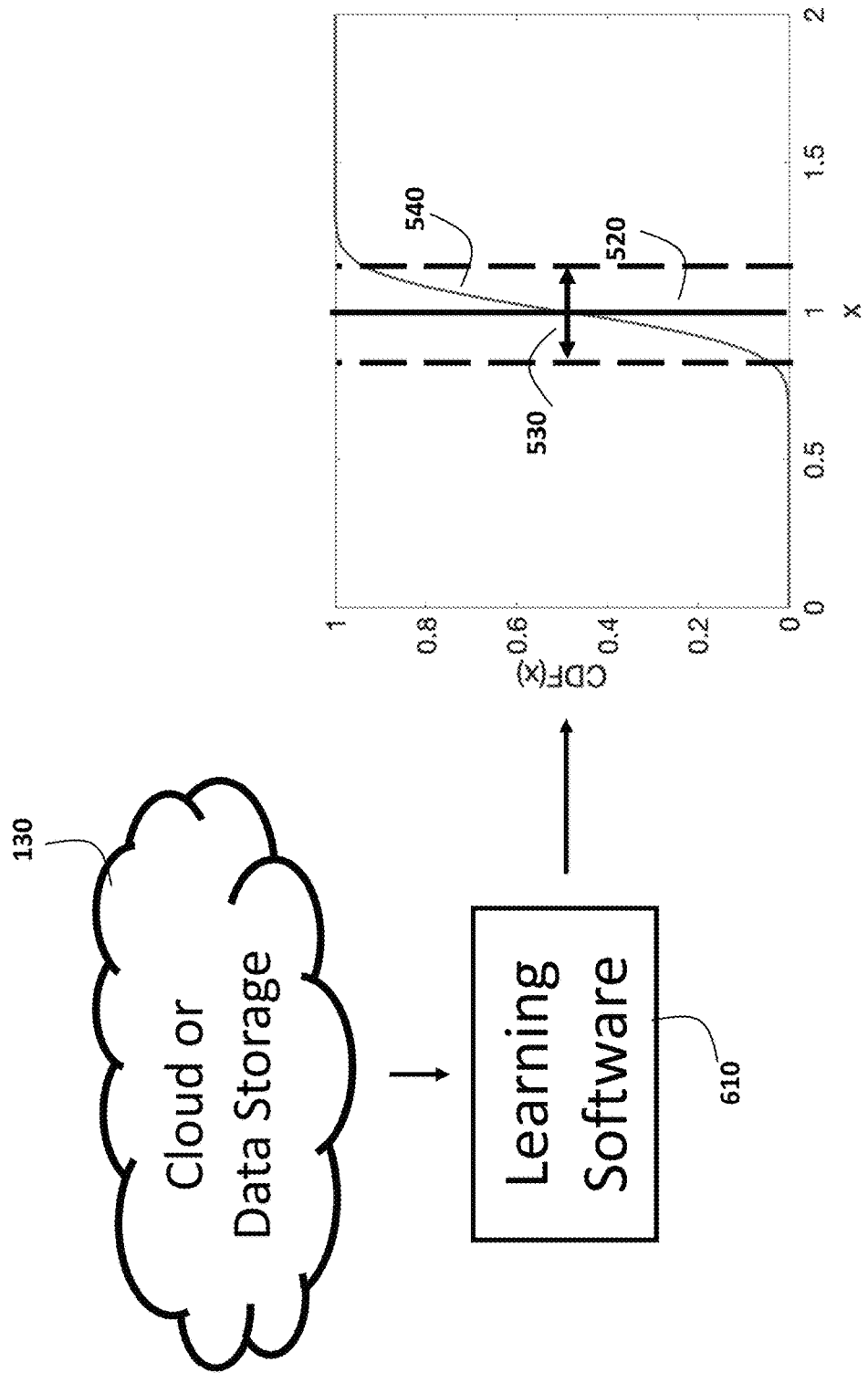
FIG. 6 shows an example of how data are used to learn parameters of a one-dimensional Gaussian distribution, according to some embodiments of the present disclosure.

FIG. 6 illustrates how data from the cloud or data storage 130 are used to learn the two parameters being the mean $\mu_{CL}$ 520 and the variance $\sigma_{CL}^2$ 530 using a learning algorithm 610 that may use equation (4).

Some embodiments use quantile functions of the crowd-local distributions 230 in order to adapt the operation of the one or multiple components of the vehicle 120. For a quantile $q \in [0, 1]$, the quantile function returns a quantile value $\tilde{x}_q$ of the distribution such that $$\tilde{x}_q = qf_{CL}(q) = \inf_x \{q \leq cdf_{CL}(x)\} \quad (5)$$

Figure 7:
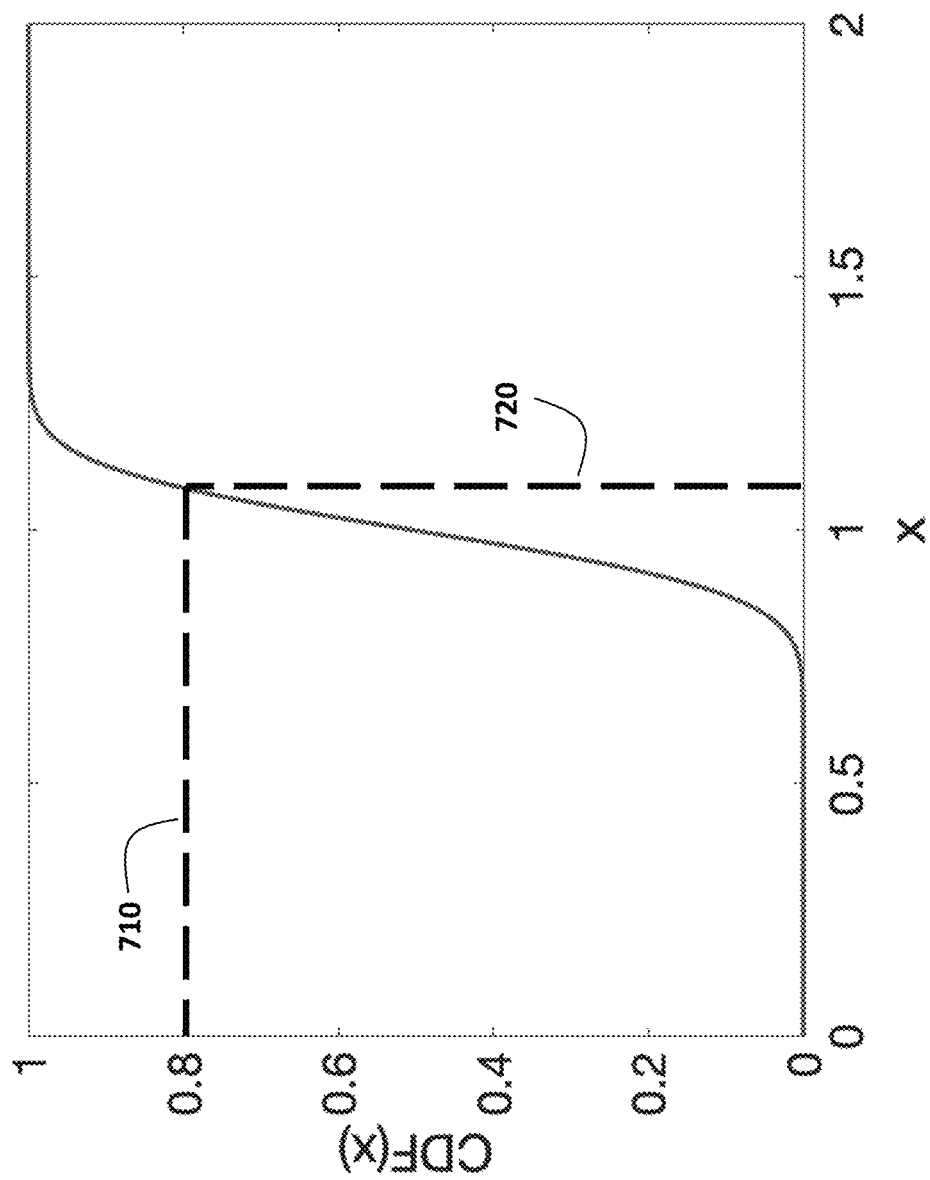
FIG. 7 shows an illustration of a quantile function, according to some embodiments of the present disclosure.

For example, the AEB system may be triggered at the braking distance $\tilde{x}_{0.1}$ indicating the value of the quantile $q=0.1$ of the crowd-local distribution 310 indicating the braking distances. For example, for the one-dimensional Gaussian distribution, the quantile function as used by some embodiments is given by $$\tilde{x}_q = qf_{CL}(q) = \mu_{CL} + \sigma_{CL}\sqrt{2}\text{erf}^{-1}(2q-1) \quad (6)$$

with an inverse error function $\text{erf}^{-1}$. FIG. 7 illustrates the quantile function, where the quantile value 720 being $\tilde{x}_{0.8}=1.1$ is returned by the quantile function using the quantile 710 being $q=0.8$.

Some other embodiments use ECDFs to form the one or multiple crowd-local distributions 230. For such ECDFs, the data are used directly to form the distribution with $$ecdf_{CL}(x) = \frac{1}{n}\sum_{i=1}^{n} 1_{x_{CL,i} \leq x} \quad (7)$$

where $1_{x_{CL,i} \leq x}$ is an indicator function returning the value "1" if $x_i \leq x$ and "0" otherwise, $$1_{x_{CL,i} \leq x} = \begin{cases} 1 & x_{CL,i} \leq x \\ 0 & \text{else} \end{cases}. \quad (8)$$

In other words, the ECDF in (7) is a stair function that increases by $1/n$ at every value $x_{CL,i}$. FIG. 3 illustrated an example of the ECDF 310, which shows the shape of the stair function. One advantage of such ECDFs is that the functions are flexible in their shape and can approximate any shape of distributions functions. Another advantage is that no function class has to be chosen for the application of the system 110.

For ECDFs, quantiles are not necessarily unique, because of the ECDFs' step function shape. In particular, if qn is an integer, then the quantile value x may any value in an interval $x_{\lfloor qn \rfloor} \leq x \leq x_{\lceil qn \rceil}$, where $\lfloor qn \rfloor$ denotes the greatest integer less than or equal to qn and $\lceil qn \rceil$ denotes the least integer greater than or equal to qn. Hence, the quantile function for ECDFs may be given by $$\tilde{x}_{CL,q} = qf_{CL}(q) = \begin{cases} x_{CL,\lceil nq \rceil} & \text{if } nq \text{ is not an integer} \\ \frac{1}{2}(x_{CL,nq} + x_{CL,nq+1}) & \text{else} \end{cases} \quad (9)$$

For example, a median is the quantile with $q=0.5$ and is given by $$\tilde{x}_{CL,0.5} = qf_{CL}(0.5) = \begin{cases} x_{CL,\lceil n/2 \rceil} & \text{if } n \text{ is odd} \\ \frac{1}{2}(x_{CL,n/2} + x_{CL,n/2+1}) & \text{else} \end{cases} \quad (10)$$

It is a body of some embodiments to use the quantile function (9) of crowd-local distributions 230 in order to adapt the operation of one or multiple components of the control of the vehicle 120. For example, the adaptation of the operation of one or multiple components may be done using the value of the median $\tilde{x}_{CL,0.5}$ (10). For example, $\tilde{x}_{CL,0.5}$ may refer to a median braking distance of the crowd-local distribution 310, which may be used to trigger a collision warning. Additionally or alternatively, a quantile with $q=0.1$ with the quantile value $\tilde{x}_{0.1}$ may be used to trigger braking of the AEB system.

Figure 8:
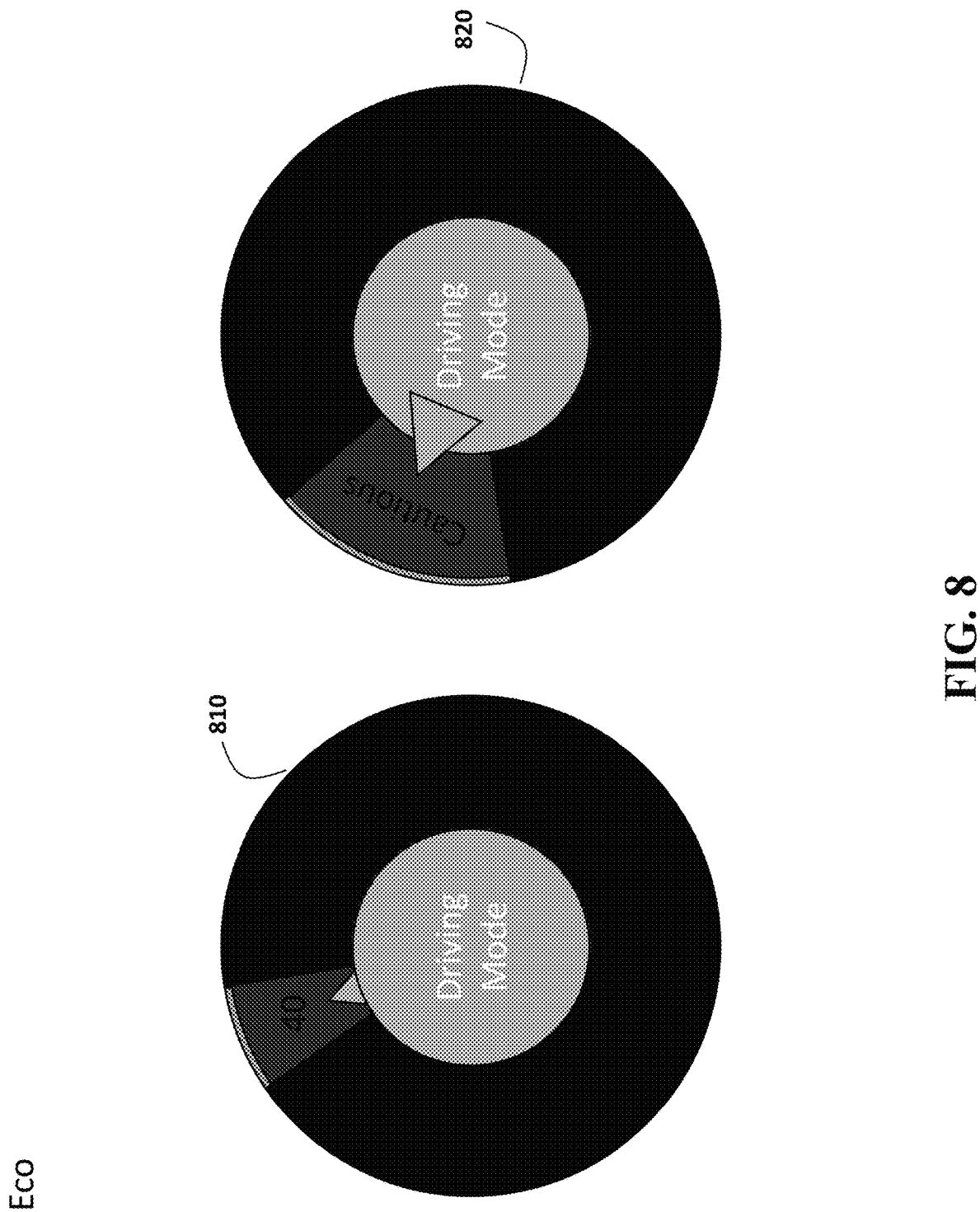
FIG. 8 illustrates a schematic of a user interface, according to some embodiments of the present disclosure.

Further, some embodiments use an adjustable setting, which may be set by a driver of the vehicle 120 to determine the quantile to be used to adapt the operation of the one or multiple components of the vehicle control. FIG. 8 illustrates a schematic of a user interface, which may be used to determine the quantile, according to some embodiments of the present disclosure. For example, the adjustable settings may be an integer scale user interface 810 from 0, 10, 20, ..., 100 relating to quantiles 0, 0.1, 0.2, ..., 1. Another example of the adjustable setting may be a qualitative setting user interface 820 such as average, cautious, or aggressive, which may be translated to the quantile $q=0.5$, the quantile $q=0.1$, or the quantile $q=0.9$. Advantages of the user interface are that the driver of the vehicle 120 may control or fine-tune the level of interventions of ADAS systems and that the crowd-local distributions 230 are used to adapt the operation of the vehicle 120 in order to account for environmental or location-specific effects such as congestion, icy roads, and the like. One advantage of using the adjustable setting is that no data of the vehicle 120 need to be collected.

In some other embodiments, two or more crowd-local distributions 230 may be combined. For example, the one or multiple components of the vehicle control may be adapted based on a quantity z being not directly available but computed using two other quantities x and y, which may be given using quantiles of CDFs as $\tilde{x}_q = qf_{x,CL}(q)$ and $\tilde{y}_q =$ $qf_{y,CL}(q)$. In this example, the third quantity z may be obtained as summation of the two quantile values as $$\tilde{z}_q = \tilde{x}_q + \tilde{y}_q. \quad (11)$$

For example, the combination of different crowd-local distributions 230 may be used to compute a quantity, which is divided into two or multiple road segments. Examples of this combination include the energy/fuel consumption of the vehicle 120, where the crowd-local distributions 230 provide information about energy/fuel consumption in such road segments. Other examples of this combination of different crowd-local distributions 230 may be to compute the braking distance including a reaction time buffer, where $\tilde{x}_q$ may be the stopping distance and $\tilde{y}_q = v \cdot \Delta t$ may be a traveled distance within a time $\Delta t$ at a vehicle velocity v. More generally, the quantity $\tilde{z}_q$ may be computed using m quantities as $$\tilde{z}_q = \sum_{i=1}^{m} \tilde{x}_q^i \quad (12)$$

where $\tilde{x}_q^i$ with $i=1, \ldots, m$ are the m quantities.

In some other embodiments, the quantile may be determined based on one or multiple crowd-global distributions, which reflect driving behaviors from multiple drivers in multiple locations or multiple environments. Additionally or alternatively, the quantile may be determined based on one or multiple ego-global distributions, which reflect driving behaviors from the vehicle in multiple locations or multiple environments. One advantage of using the one or multiple crowd-global distributions and the one or multiple ego-global distributions for computing the quantiles are that the user interface may not be needed. Instead, the quantiles may be computed automatically.

Figure 9:
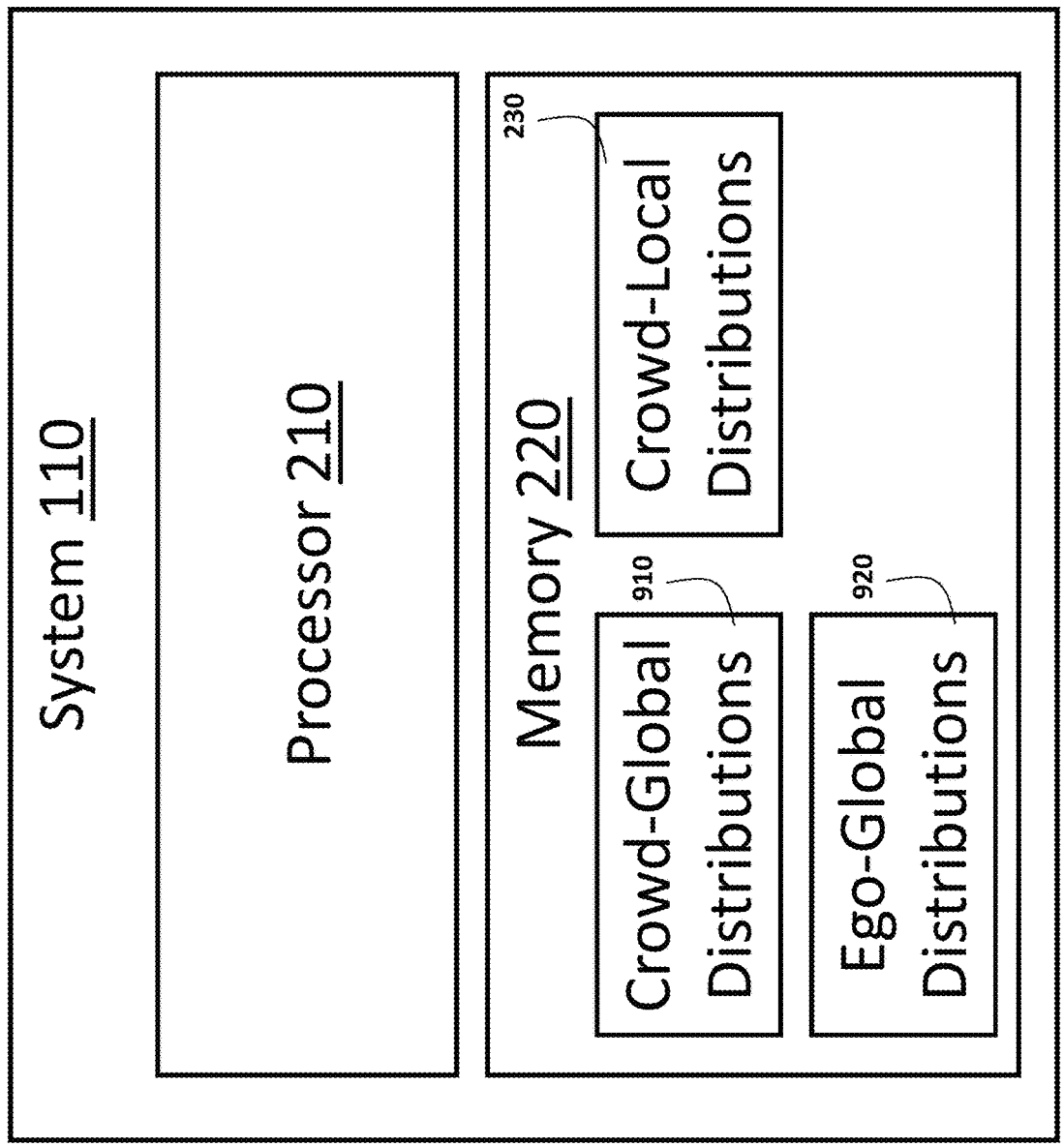
FIG. 9 illustrates an extended block diagram of a control system for controlling an operation of a vehicle, according to some embodiments of the present disclosure.

FIG. 9 shows an alternative block diagram 900 of the system 110 for controlling the motion or components of the vehicle 120, according to some embodiments of the present disclosure. The system 110 includes the processor 210 and the memory 220 storing the one or multiple crowd-local distributions 230. The processor 210 is configured to execute stored instructions in the memory 220 to cause the system 110 to execute the one or multiple actions in order to control the vehicle 120. Here, the memory 220 may also store one or multiple crowd-global distributions 910 and one or multiple ego-global distributions 920. The processor 210 is configured to execute stored instructions in the memory 220 to cause the system 110 to execute one or multiple actions in order to control the vehicle 120. The system 110 may use data provided from the cloud or data storage 130. For example, the cloud or data storage 130 may provide the system 110 with the one or multiple crowd-local distributions 230, the one or multiple crowd-global distributions 910, and/or the one or multiple ego-global distributions 920.

In some embodiments, the quantiles may be determined from data of past driving patterns. Some embodiments use crowdsourcing in order to obtain the crowd-global distribution 910. In particular, some embodiments use data collected from multiple drivers in multiple locations or multiple environments to derive the crowd-global distribution 910. The data may be a set of the form $$\text{Data}_{CG} = \{x_{CG,1}, x_{CG,2}, \ldots, x_{CG,n_2}\}, \quad (13)$$

where $x_{CG,i}$ are the $n_2$ data points.

Similarly to the crowd-local distributions 230, the crowd-global distributions 910 may be given by an analytical CDF or by an ECDF. For example, the crowd-global distribution may be the one-dimensional Gaussian distribution given by $$cdf_{CG}(x) = \frac{1}{2}\left(1 + \text{erf}\left(\frac{x - \mu_{CG}}{\sigma_{CG}\sqrt{2}}\right)\right) \quad (14)$$

with a mean $\mu_{CG}$ and a variance $\sigma_{CG}^2$ of the crowd-global distribution, for which the quantile function is $$\tilde{x}_{CG,q} = qf_{CG}(q) = \mu_{CG} + \sigma_{CG}\sqrt{2}\text{erf}^{-1}(2q-1). \quad (15)$$

For such analytical CDFs, the data gathered from different driving conditions as in (13) are used to learn parameters of the one-dimensional Gaussian distribution being the mean $\mu_{CG}$ and the variance $\sigma_{CG}^2$.

For the crowd-global distribution being given by ECDFs, the data (13) are used directly to form the distribution with $$ecdf_{CG}(x) = \frac{1}{n}\sum_{i=1}^{n} 1_{x_{CG,i} \leq x} \quad (16)$$

where the quantile function may be given by $$x_{CG,q} = qf_{CG}(q) = \begin{cases} x_{CG,\lceil nq \rceil} & \text{if } nq \text{ is not an integer} \\ \frac{1}{2}(x_{CG,nq} + x_{CG,nq+1}) & \text{else} \end{cases} \quad (17)$$

Additionally or alternatively, some embodiments use data collected from the vehicle 120 in the multiple locations or multiple environments to derive the ego-global distributions 920. The data may be a set of the form $$\text{Data}_{EG} = \{x_{EG,1}, x_{EG,2}, \ldots, x_{EG,n_3}\}, \quad (18)$$

where $x_{EG,i}$ are the $n_3$ data points.

The ego-global distributions 920 may be given by analytical CDFs or by ECDFs. For example, the ego-global distribution may be the one-dimensional Gaussian distribution given by $$cdf_{EG}(x) = \frac{1}{2}\left(1 + \text{erf}\left(\frac{x - \mu_{EG}}{\sigma_{EG}\sqrt{2}}\right)\right) \quad (19)$$

with a mean $\mu_{EG}$ and a variance $\sigma_{EG}^2$ of the ego-global distribution, for which the quantile function is $$\tilde{x}_{EG,q} = gf_{EG}(q) = \mu_{EG} + \sigma_{EG}\sqrt{2}\text{erf}^{-1}(2q-1). \quad (20)$$

For such analytical CDFs, the data gathered from different driving conditions as in (18) are used to learn parameters of the distributions, which are the mean $\mu_{EG}$ and the variance $\sigma_{EG}^2$.

For the ego-global distribution being given by ECDFs, the data (18) are used directly to form the distribution with $$ecdf_{EG}(x) = \frac{1}{n}\sum_{i=1}^{n} 1_{x_{EG,i} \leq x} \quad (21)$$

where the quantile function may be given by $$\tilde{x}_{EG,q} = qf_{EG}(q) = \begin{cases} x_{EG,\lceil nq \rceil} & \text{if } nq \text{ is not an integer} \\ \frac{1}{2}(x_{EG,nq} + x_{EG,nq+1}) & \text{else} \end{cases} \quad (22)$$

Some embodiments use the one or multiple crowd-global distributions 910 and the one or multiple ego-global distributions 920 in order to compute the quantile q. For example, the quantile may be computed as $$q = cdf_{CG}(\tilde{x}_{EG}) \quad (23)$$

with an ego-global value $\tilde{x}_{EG}$, which may be computed as $$\tilde{x}_{EG} = qf_{EG}(q_{EG}) \quad (24)$$

with an ego-global quantile $q_{EG}$. One advantage of using both the crowd-global distribution and the ego-global distribution is that the ego-global quantile $q_{EG}$ may be set to the same value for different drivers and the resulting quantile value $\tilde{x}_{CL,q} = qf_{CL}(q)$ with $q = cdf_{CG}(\tilde{x}_{EG})$ and $\tilde{x}_{EG} = qf_{EG}(q_{EG})$ is adapted to each driver.

Figure 10:
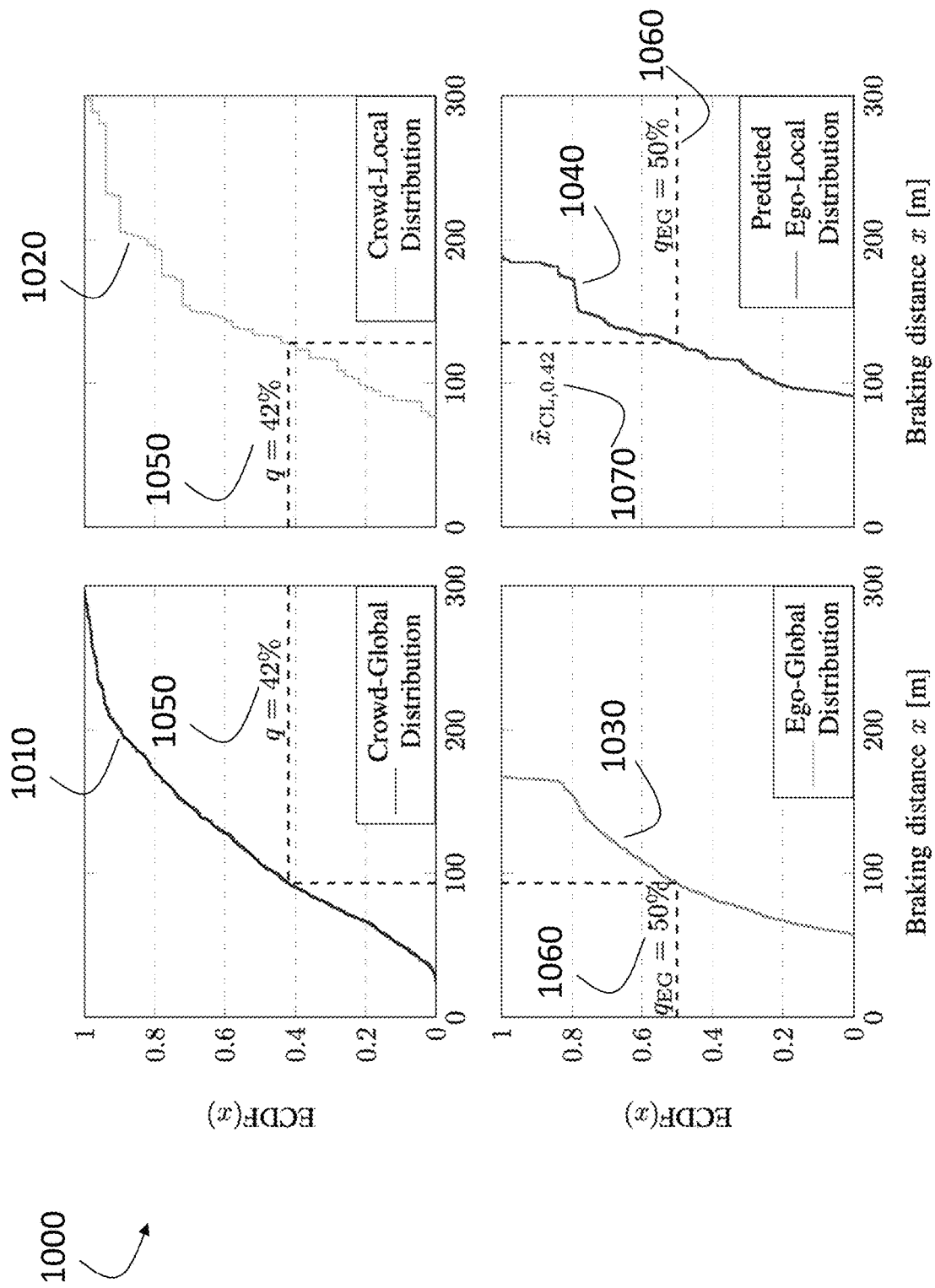
FIG. 10 illustrates a procedure to compute a value for adapting the operation of a vehicle, according to some embodiments of the present disclosure.

FIG. 10 illustrates an example of the crowd-global distribution 1010, the crowd-local distribution 1020, and the ego-global distribution 1030. It shows a value $\tilde{x}_{CL,0.42} = 125$ m=$qf_{CL}(q)$ with $q=0.42=cdf_{CG}(\tilde{x}_{EG})$ and $\tilde{x}_{EG}=95$ m=$qf_{EG}(q_{EG})$, where $q_{EG}=0.5$. In other words, the vehicle 120 having the ego-global distribution 1030 and the ego-global quantile 1060 with $q_{EG}=0.5$ ranks at the quantile $q=0.42$ of the crowd-global distribution 1050. The quantile value $\tilde{x}_{CL,0.42}=125$ m may then be used in order to calibrate the AEB system of the vehicle 120. For example, $\tilde{x}_{CL,0.42}=125$ m may be used to trigger a warning signal to the driver of the vehicle 120 or $\tilde{x}_{CL,0.42}=125$ m may be used to intervene in the control of the vehicle 120 by triggering the braking.

For example, for calibrating AEB using braking distances for a cautious driver having collected longer breaking distances reflected in the ego-global distribution, the value $\tilde{x}_{CL,q}$ may be higher and the AEB may be triggered earlier. For calibrating AEB for a more aggressive driver having collected shorter breaking distances reflected in the ego-global distribution, the value $\tilde{x}_{CL,q}$ may be smaller and the AEB may be triggered later.

As another example, the system 100 may be used to calibrate a driving mode for the specific vehicle 230 in order to reach the destination without running out of fuel or energy. In this example, the value $\tilde{x}_{CL,q}$ reflecting an energy consumption of a trip may be higher for a vehicle having used more fuel/energy in the past reflected in the ego-global distribution. Hence, if the fuel or energy level becomes low, the system 100 may adjust the driving mode to eco driving mode in order to reach the destination. Similarly, the value $\tilde{x}_{CL,q}$ reflecting the energy consumption of a trip may be smaller for a vehicle having used less fuel/energy in the past reflected in the ego-global distribution. Hence, for this vehicle, the system 100 may not have to choose eco driving mode, because the vehicle uses less fuel/energy. The advantage of the system 100 for both the more cautious and the more aggressive driver is that the crowd-local distribution takes location-specific and environmental aspects into consideration. For example, for heavy traffic, the energy consumption may be higher, which may yield higher values $\tilde{x}_{CL,q}$ and may impact the decision for the driving mode.

In some other embodiments, one or multiple ego-local distribution 1040 may be used directly in order to adapt the operation of the vehicle 120, rather than using the quantile value 1070. The one or multiple ego-local distribution 1040 may be computed using the one or multiple crowd-global distribution 1010, the one or multiple crowd-local distribution 1020, and the one or multiple ego-global distribution 1030. For example, $\tilde{x}_{CL,q}$ may be computed for a range of ego-global quantiles such as $q_{EG}=0.01, 0.02, \ldots, 0.99$, which may result in a data set $$\text{Data}_{EL} = \{\tilde{x}_{CL,0.01}, \tilde{x}_{CL,0.02}, \ldots, \tilde{x}_{CL,0.99}\}. \quad (25)$$

The computed quantile values (25) may be used to in order to obtain an analytical CDF or an ECDF. For example, the ego-local distribution 1040 may be the one-dimensional Gaussian distribution given by $$cdf_{EL}(x) = \frac{1}{2}\left(1 + \text{erf}\left(\frac{x - \mu_{EL}}{\sigma_{EL}\sqrt{2}}\right)\right) \quad (26)$$

with a mean $\mu_{EL}$ and a variance $\sigma_{EL}^2$ of the ego-local distribution. For the one-dimensional Gaussian distribution, the data (25) may be used to learn parameters of the distributions as $$\mu_{EL} = \frac{1}{99}\sum_{i=1}^{99}\tilde{x}_{CL,i/100}, \sigma_{EL}^2 = \frac{1}{99}\sum_{i=1}^{99}(\tilde{x}_{CL,i/100} - \mu_{EL})^2. \quad (27)$$

Additionally or alternatively, for the ego-local distribution being given by a ECDF, the data (25) may be used directly to form the distribution with $$ecdf_{EL}(x) = \frac{1}{99}\sum_{i=1}^{99} 1_{\tilde{x}_{CL,i/100} \leq x}. \quad (28)$$

In some embodiments, the one or multiple ego-local distribution 1040 may be used directly in order to adapt the operation of the vehicle 120, rather than using the quantile value 1070. For example, the one or multiple ego-local distribution 1040 may be used to gradually increase the level of intervention by the ADAS. For example, a braking assistance system may start braking with little braking pressure earlier and gradually increase the braking pressure depending on the distance to the traffic light and the ego-local distribution. For example, the braking assistance may be linked to the quantile of the ego-local distribution 1040 such that the braking assistance is at 1% for the quantile value $\tilde{x}_{EL,0.01}$ of the ego-local distribution, the braking assistance is at 10% for the quantile value $\tilde{x}_{EL,0.10}$, the braking assistance is at 90% for the quantile value $\tilde{x}_{EL,0.9}$, and so on.

As another example, the driving mode may be gradually adjusted based on the ego-local distribution reflecting the energy/fuel consumption. For example, rather than having distinct driving modes such as eco driving mode, comfort driving mode, or sport driving mode, the driving mode may be adjusted gradually.

Figure 11:
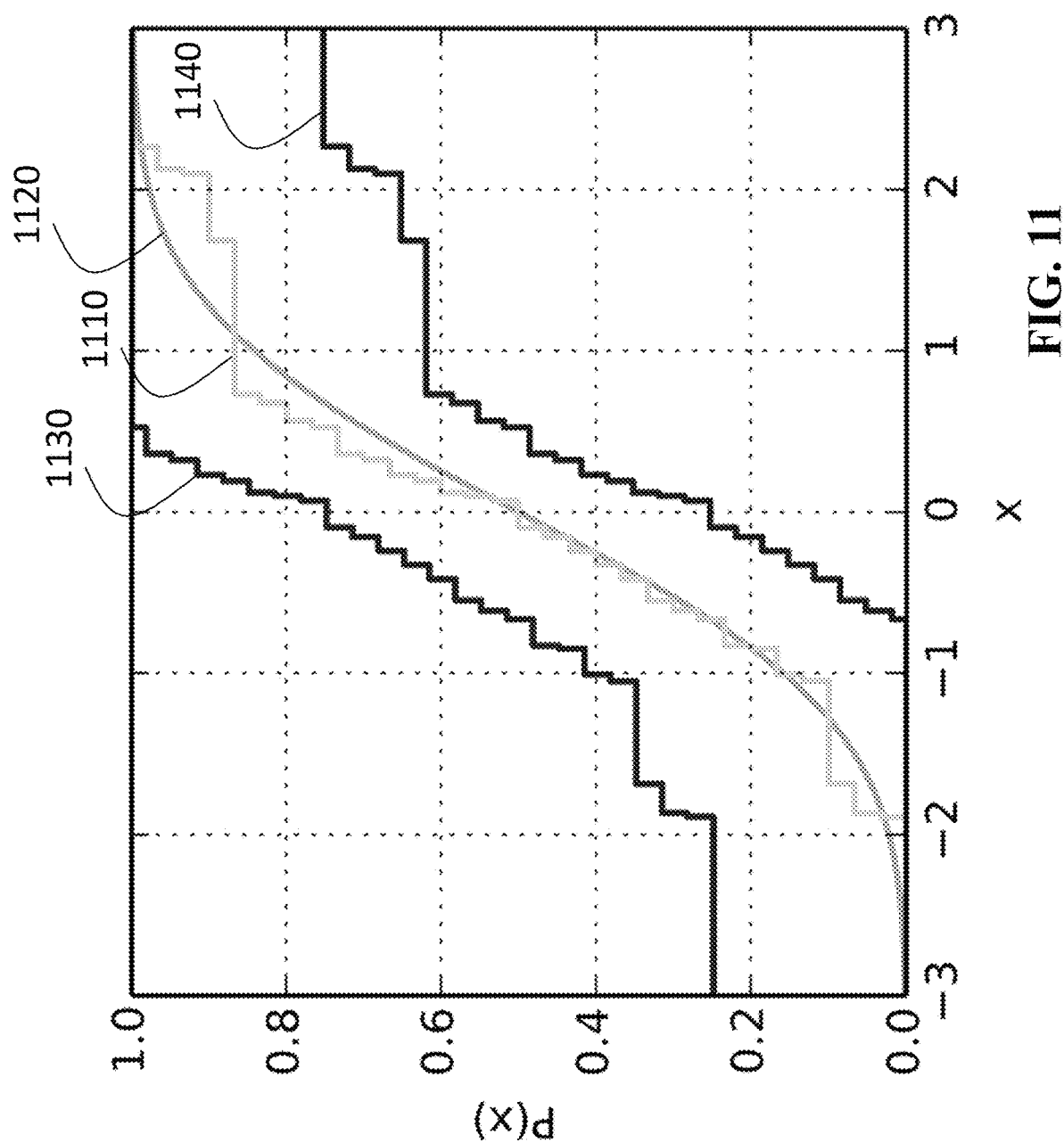
FIG. 11 illustrates a confidence level of an empirical cumulative distribution function, according to some embodiments of the present disclosure.

In some other embodiments, confidence levels may be used in order to adapt the operation of the vehicle 120. The confidence levels may be given as a function of the number of data points collected in (1), (13), or (18). For example, FIG. 11 illustrates the confidence level of an ECDF 1110. For the ECDF 1110, the confidence level may be given by the Dvoretsky-Kiefer-Wolfowitz inequality stating a bound on the probability that the ECDF approximates a true CDF 1120 within a small value E, $$Pr\left(\sup_x(ecdf(x) - cdf(x)) > \epsilon\right) \le 2e^{-2n\epsilon^2} \qquad (29)$$

where n is the number of data samples. In other words, the more data samples n the system 110 has, the more confident it may be about intervening or triggering an action appropriately. The confidence level (29) may be used to compute a lower bound 1130 of the ECDF 1110 and an upper bound 1140 of the ECDF 1110. The lower bound 1130 and/or the upper bound 1140 may be used in order to adapt the operation of the vehicle 120. For example, the lower bound 1130 may be used in order to calibrate the AEB. Using the lower bound 1130 may have the advantage that the system 110 is more confident about intervening in controlling the vehicle 120 and may not intervene unnecessarily. Unnecessary intervention may be perceived as discomforting by a driver of the vehicle 120.

Figure 12:
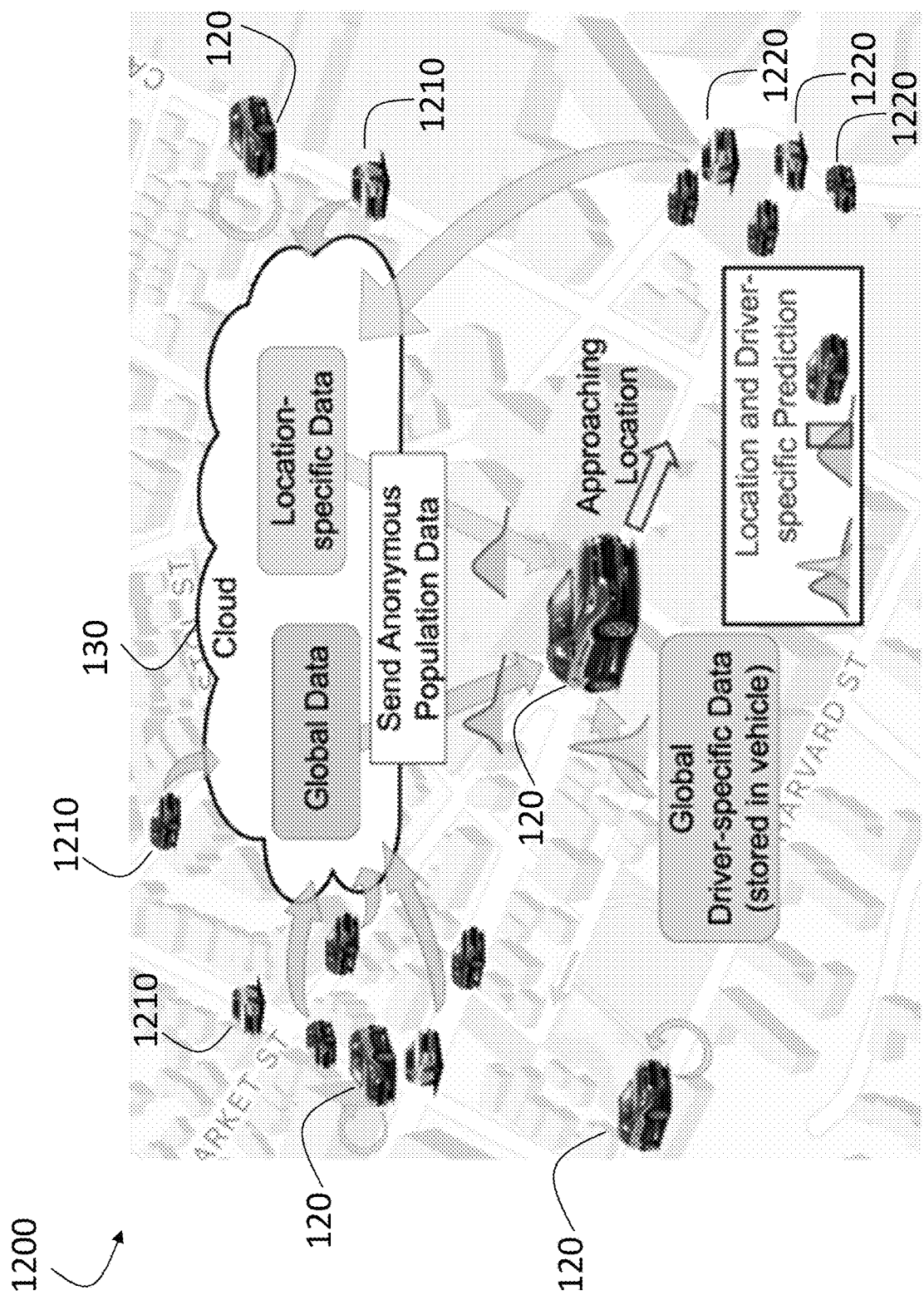
FIG. 12 illustrates a smart city infrastructure, according to some embodiments of the present disclosure.

FIG. 12 illustrates a smart city infrastructure 1200, where the system 110 may be used in order to adapt the operation of the vehicle 120. The data collected from the multiple vehicles in the multiple locations or multiple environments 1210 may be used to obtain the crowd-global distributions 910. Additionally or alternatively, the data collected from the vehicles 120 in the multiple locations or multiple environments may be used to obtain the ego-global distributions 920. Additionally or alternatively, the data collected from the multiple vehicles in the specific location or environment 1220 may be used to obtain the crowd-local distributions 230. The system 110 may then be used to calibrate the ADAS systems to the specific location or environment.

Some concrete examples for the application of the present disclosure include calibrating the ACC of the vehicle 120, calibrating the AEB of the vehicle 120, calibrating the warning sounds and/or warning light trigger of the vehicle 120, calibrating the driving mode of the vehicle 120, calibrating the lane-change warning trigger of the vehicle 120, calibrating an obstacle detection based on lateral accelerations of the vehicle 120, and the like.

For example, the ACC may be adjusted based on a crowd-local distribution indicating the average distance that the multiple vehicles in the specific location or environment 1220 kept from the vehicle driving ahead of them. For example, if the median with q=0.5 of the crowd-local distribution indicating the average distance is 30 m, then the ACC may be adjusted to keep a distance of 30 m from a vehicle ahead of the vehicle 120, i.e., $\tilde{x}_{CL,0.5}=30$ m. If the median with q=0.5 of the crowd-local distribution indicating the average distance is 80 m, then the ACC may be adjusted to keep a distance of 80 m from a vehicle ahead of the vehicle 120, i.e., $\tilde{x}_{CL,0.5}=80$ m. This example of the adjustable ACC may be useful to adjust the vehicle 120 to the current situation. For example, if the vehicle 120 is driving in highly-congested roads during rush hour, then the ACC may need to keep a shorter distance to the vehicle ahead of the vehicle 120. Otherwise, other vehicles may pull in ahead of the vehicle, which may be perceived as uncomfortable and may trigger the ACC to brake in order to keep a certain distance from the vehicle that pulled in ahead. On the other hand, if the vehicle 120 is driving on country roads during the night, then the ACC may need to keep a longer distance to the vehicle ahead of the vehicle 120. Otherwise, the vehicle ahead of the vehicle 120 may be blinded by the headlights of the vehicle 120, which may be dangerous.

As another example, the AEB may be adjusted based on a crowd-local distribution indicating the braking distance of the multiple vehicles in the specific location or environment 1220. For example, if the quantile value of the quantile q=0.1 of the crowd-local distribution indicating the braking distance is 50 m, then the AEB may be adjusted to be triggered when the vehicle 120 is at a distance of 50 m from an obstacle, i.e., $\tilde{x}_{CL,0.1}=50$ m. Additionally or alternatively, an obstacle warning sound and/or warning light may be adjusted based on a crowd-local distribution indicating the braking distance of the multiple vehicles in the specific location or environment 1220. Here, if the quantile value of the quantile q=0.3 of the crowd-local distribution indicating the braking distance is 70 m, then the warning sounds and/or the warning light may be triggered when the vehicle 120 is at a distance of 70 m from an obstacle, i.e., $\tilde{x}_{CL,0.3}=70$ m. In this example, if the vehicle 120 is approaching the obstacle, the warning sounds and/or warning light is triggered at 70 m from the obstacle and, if the driver of the vehicle 120 does not react to the warning, the AEB starts braking at a distance 50 m from the obstacle. This example of the adjustable AEB and the adjustable warning sounds and/or warning light may be useful to adjust the vehicle 120 to the current situation. For example, if the vehicle 120 is driving on snow or icy roads, then the AEB and the warning sounds and/or warning light may be triggered at longer distances in order to increase safety. If the vehicle 120 is driving on asphalt or other predictable road conditions, then the AEB and the warning sounds and/or warning light may be triggered at shorter distances in order to avoid unnecessary interventions, which may be perceived as uncomfortable.

As another example, the driving mode of battery electric vehicles may be adjusted based on a crowd-local distribution indicating the energy consumption of the multiple vehicles in the specific location or environment 1220. For example, if the quantile value of the quantile q=0.1 of the one or multiple crowd-local distribution indicating the energy consumption of the remainder of the trip is 200 MJ and the battery of the vehicle 120 has 210 MJ left, then the driving mode may be adjusted to eco-driving in order to avoid running out of energy before completing the trip, which may be beneficial as stopping to re-charge before completing the trip may be perceived as inconvenient.

Some advantages of using the present disclosure of the system 110 include that the adaptation of the control of the vehicle 120 is agnostic to the driving situation and that data may not be labeled. For example, the crowd-local distribution may represent prolonged braking distances for different scenarios such as rain, ice, or ice on the road or higher congestion. In this example, the cause of the prolonged braking distances need not be known. Instead, the crowd-local distribution reflecting prolonged braking distances may adapt the operation of vehicle 120 to be more cautious. The advantage of not having to label the cause of an effect makes the adaptation agnostic to the driving condition and the data collection becomes easier.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

The invention claimed is:

1. A vehicle, comprising:
a control system configured to accept a driving input from a driver of a vehicle and transform the driving input into actuation of wheels of the vehicle to perform a driving maneuver;
an advanced driver-assistance system (ADAS) configured to intervene in an operation of the control system by complementing or overriding the driving input in response to detecting a driving condition dependent on a calibration parameter indicative of a preference of execution of the driving maneuver;
a receiver configured to receive over a wireless channel a crowd-local distribution function of the calibration parameter indicative of a distribution of the preference of execution of the driving maneuver by other drivers of other vehicles at a specific location or a specific environment; and
a processor configured to adapt the calibration parameter of the ADAS based on the crowd-local distribution function of the calibration parameter in response to detecting that the vehicle approaches the specific location or the specific environment.

2. The vehicle of claim 1, wherein the processor is configured to adapt the calibration parameter of the ADAS based on a quantile value of the crowd-local distribution function.

3. The vehicle of claim 2, wherein to adapt the calibration parameter, the processor is configured to:
quantized values of the crowd-local distribution function according to a quantile resolution of quantile values; and
select a quantized value of the crowd-local distribution function corresponding to the quantile value; and
update the calibration parameter based on the selected quantized value.

4. The vehicle of claim 3, wherein the quantized values of the crowd-local distribution function are formed by averaging values of the crowd-local distribution function falling within a corresponding quantization partition.

5. The vehicle of claim 2, wherein to adapt the calibration parameter, the processor is configured to:
determine a difference between a value of the crowd-local distribution function indicated by the quantile value and a median value of the crowd-local distribution function; and
shift values of the crowd-local distribution function in a direction indicated of a sign of the difference with a step indicated by a value of the difference.

6. The vehicle of claim 2, further comprising:
an input device configured to accept input from the driver specifying the quantile value on a predetermined scale defining a resolution of the adaptation of the calibration parameter, wherein to adapt the calibration parameter the processor is configured to:
select a value of the calibration parameter corresponding to a range identified by partitioning the crowd-local distribution function into a set of groups according to the resolution of adaptation and selecting the value of the calibration parameter corresponding to an average value in the group identified by the quantile value.

7. The vehicle of claim 1, wherein the crowd-local distribution function is computed using two or more other crowd-local distribution functions.

8. The vehicle of claim 1, wherein the calibration parameter of the ADAS is adapted gradually such that the interventions of the ADAS are gradually increasing based on the crowd-local distribution.

9. The vehicle of claim 1, wherein the calibration parameter of the ADAS is adapted such that the interventions of the ADAS are gradually increasing based on the crowd-local distribution and a confidence level of the crowd-local distribution.

10. The vehicle of claim 1, wherein
the receiver is further configured to receive over a wireless channel a crowd-global distribution function of the calibration parameter indicative of a distribution of the preference of execution of the driving maneuver by different drivers of different vehicles at various locations or environments;
the processor is further configured to
collect driving inputs at corresponding driving conditions for performing the driving maneuver at various locations or environments of operation of the vehicle;
construct, from the driving inputs at driving conditions, an ego-global distribution function of the calibration parameter indicative of a distribution of the preference of execution of the driving maneuver by the driver of the vehicle at the various locations or environments;
compare the ego-global distribution function with the crowd-global distribution function to determine a ranking of the preference of execution of the driving maneuver by the driver of the vehicle at various locations or environments with respect to the different drivers of different vehicles at different locations or environments;
adjust the crowd-local distribution function of the calibration parameter according to the determined ranking to produce an ego-local distribution function of the calibration parameter for the specific locality;
adjust the calibration parameter of the ADAS based on the ego-local distribution function of the calibration parameter in response to detecting that the vehicle approaches the specific location or the specific environment.

11. The vehicle of claim 10, wherein the calibration parameter of the ADAS is adapted such that the interventions of the ADAS are gradually increasing based on the ego-local distribution.

12. The vehicle of claim 10, wherein the calibration parameter of the ADAS is adapted such that the interventions of the ADAS are gradually increasing based on the ego-local distribution and a confidence level of the ego-local distribution.

13. The vehicle of claim 1, wherein the crowd-local distribution function is given by an analytical cumulative distribution function.

14. The vehicle of claim 1, wherein the crowd-local distribution function is given by an empirical cumulative distribution function.

15. The vehicle of claim 1, wherein the crowd-local distribution function is computed using data collected from other vehicles at the specific location or the specific environment.

16. The vehicle of claim 1, further comprising:
a transmitter configured to transmit the driving input indicative of the calibration parameter over the wireless channel to update the crowd-local distribution function of the calibration parameter.

17. The vehicle of claim 1, wherein the ADAS includes an automatic emergency braking (AEB) system, and the calibration parameter indicates one or a combination of a distance to a stopping line when the AEB starts to intervene or complement the driving input commanding the control system to brake the vehicle and a ratio between an extent of braking and a distance to a stopping line.

18. The vehicle of claim 1, wherein the ADAS includes adaptive cruise control (ACC) system, and the calibration parameter indicates a target distance to be kept from a leading vehicle driving ahead of the vehicle.

19. A method for controlling a vehicle, comprising:
accepting a driving input from a driver of a vehicle and transforming the driving input into actuation of wheels of the vehicle to perform a driving maneuver;
receiving over a wireless channel a crowd-local distribution function of the calibration parameter indicative of a distribution of the preference of execution of the driving maneuver by other drivers of other vehicles at a specific location or a specific environment;
adapting a calibration parameter of an advanced driver-assistance system (ADAS) based on the crowd-local distribution function of the calibration parameter in response to detecting that the vehicle approaches the specific location or the specific environment; and
complementing or overriding the driving input using the ADAS calibrated with the calibration parameter indicative of a preference of execution of the driving maneuver.

* * * * *